US006991158B2

(12) United States Patent  (10) Patent No.: US 6,991,158 B2
Munte  (45) Date of Patent: Jan. 31, 2006

(54) MOBILE PAPER RECORD PROCESSING SYSTEM

(76) Inventor: Ralf Maximilian Munte, Munchener Freiheit 22, Munich (DE) D-80802

( * ) Notice: Subject to any disclaimer, the term of this patent is extended or adjusted under 35 U.S.C. 154(b) by 5 days.

(21) Appl. No.: 10/907,001

(22) Filed: Mar. 16, 2005

(65) Prior Publication Data

US 2005/0205660 A1    Sep. 22, 2005

Related U.S. Application Data

(63) Continuation of application No. PCT/IB2005/050913, filed on Mar. 15, 2005.

(60) Provisional application No. 60/594,140, filed on Mar. 14, 2005, provisional application No. 60/521,232, filed on Mar. 16, 2004.

(51) Int. Cl.
G06F 17/60    (2006.01)

(52) U.S. Cl. .................. 235/379; 235/382; 235/462.01; 235/470; 705/16; 705/42; 705/43; 705/44; 705/65

(58) Field of Classification Search ................. 235/379, 235/382, 472.01, 470; 705/16, 42–44, 65
See application file for complete search history.

(56) References Cited

U.S. PATENT DOCUMENTS

| 5,910,988 | A  | 6/1999  | Ballard        |
|-----------|----|---------|----------------|
| 6,032,137 | A  | 2/2000  | Ballard        |
| 6,397,194 | B1 | 5/2002  | Houvener et al.|
| 6,570,612 | B1 | 5/2003  | Saund et al.   |
| 6,816,608 | B2 | 11/2004 | Cato           |
| 2003/0106016 | A1 | 6/2003 | Kendrick et al.|
| 2003/0158819 | A1 | 8/2003 | Scott           |
| 2004/0028295 | A1 | 2/2004 | Allen et al.    |
| 2004/0042680 | A1 | 3/2004 | Saund           |
| 2005/0097046 | A1* | 5/2005 | Singfield ..................... 705/42 |

FOREIGN PATENT DOCUMENTS

| EP | 1387560     | 2/2004 |
| GB | 2 356 101 A | 5/2001 |
| JP | 2004094947 A | 3/2004 |

OTHER PUBLICATIONS

Heather Clancy, Cellphones Get a New Job Description: Portable Scanner, http://www.nytimes.com/2005/02/10/technology/circuits/, Feb. 10, 2005, Page(s) 1-3, Publisher: The New York Times Company.

Economist.com, Phones with eyes, The Economist Newspaper and The Ecoomist Group, Mar. 10, 2005, Page(s) 1-4.

Xerox Research Centre Europe, Capture documents with a digital camera or cameraphone, Document Imaging With Cameras, Oct. 1 2004, Page(s) 1.

(Continued)

*Primary Examiner*—Karl D. Frech
*Assistant Examiner*—Allyson N Trail
(74) *Attorney, Agent, or Firm*—Oppedahl & Larson LLP

(57) ABSTRACT

A method is disclosed for electronically capturing and storing paper records for accounting purposes using a mobile handheld device with an integrated digital camera or scanner. This method involves digitalizing a paper receipt with a digital camera or scanner, manually entering accounting data into a form presented on the display of a handheld device and performing a wireless transmission of the digital image of the paper record together with the entered information to a record storing system. The storing system securely stores the digital image of the record for future references and transmits manual entered record data to an accounting application using existing telecommunication or data networks.

35 Claims, 13 Drawing Sheets

OTHER PUBLICATIONS

Xerox Research Centre Europe, Capture documents with a digital camera or camera phone!, Mobile Document Imaging—Slide show, Nov. 1, 2004, Page(s) 1-14.

Xerox Research Centre Europe, What is mobile document imaging (MDI)?, Mobile Document Imaging—Slide show, Nov. 1, 2004.

* cited by examiner

FIGURE 11

| Data Element | Sample Data |
|---|---|
| Customer Phone Number | 1.222.3333331 |
| Account Status | active |
| Client data entry application version | 2004/05/06 |
| Retrieval Preference | without Image |
| Last Retrieval Date | 2004/03/09 |
| Data Format | ASCII |
| User Name | John Schmidt |
| Password | ***** |
| Credit account 1, tag text | 8888, credit card |
| Credit account 2, tag text | 9999, cash |
| ... Credit account n, tag text | ... |
| Debit accounts 1, tag text | 1111, Meals |
| Debit accounts 2, tag text | 2222, Transportation cost |
| ... Debit accounts n, tag text | ... |
| Cost Center 1, tag text | 2345, project 1 |
| Cost Center 2, tag text | 3456, project 2 |
| ... Cost Center n, tag text | |

380

MOBILE PAPER RECORD PROCESSING SYSTEM

CROSS-REFERENCE TO RELATED APPLICATIONS

This application is a continuation of International Patent Application No. PCT/IB2005/050913 filed Mar. 15, 2005 which claims the benefit of U.S. Application No. 60/521,232 filed Mar. 16, 2004 and U.S. Application No. 60/594,140 filed Mar. 14, 2005, all of which applications are hereby incorporated herein by reference for all purposes.

BACKGROUND OF THE INVENTION

The two most common methods for entering the paper records from financial transactions into financial applications are 'manual data entry with physical record storing' and 'manual data entry with digital record storing'.

An example of 'manual data entry with physical record storing' is a small business owner who collects all of his paper records for a period of time, manually enters relevant accounting data from the records into a financial application and then stores the paper records in an orderly fashion in file folders.

Another example is a business traveler who collects all paper records until the end of his travel, enters the relevant accounting information into a spreadsheet or expense reporting application, sends the paper receipts by mail and then submits the electronic expense report via email or a data network to his company for reimbursement.

'Manual data entry with digital record storing' is primarily used by large corporations. A common example is a business traveler who collects all paper records until the end of his travel, then enters and submits accounting relevant information into an expense report application. The application then generates a bar code that identifies the expense report. The employee faxes all receipts together in one single fax to a digital storing system using the bar coded confirmation page as a fax cover sheet. An optical recognition system interfacing the digital storing system recognizes the bar code on the cover sheet and identifies the expense report to which the receipts relate.—The receipt images are automatically associated with the correct expense report.

A less common but existing method is automated data entry with digital record storing. A financial record is scanned into an application able to automatically read all accounting relevant data from the record using Optical Character Recognition Systems. Because of the time consuming initial setup for each record layout, this method is only economical for high volumes of a limited number of different record layouts. As this method can not guaranty one hundred percent correct character recognition, all receipts need to be checked manually to insure that they were processed correctly.

In some existing methods of entering information from financial transaction receipts in to an application, the person who enters them into the application is not the same person as the one who was connected with the transaction noted upon the receipt. Alternatively, the person who enters the data into the application is using two different methods/devices to do so. For example: A business traveler collects receipts during travel and gives them to an accounting department. An assistant scans all of the receipts. An accountant looks up each receipt and enters a date, amount, debit account number (directly related to expense type) and credit account number (related to payment type and/or the identity of the business traveler himself) into a financial application. A second example is: A business traveler collecting receipts during travel. At the end of the travel, the traveler enters a user ID (usually via application login), date, amount and expense type (debit account number) into a device. To digitalize the receipts, the traveler needs to change the device using a scanner or facsimile. Both devices are NOT personal devices. Therefore the traveler needs to use barcode stickers or barcodes fax cover pages to identify himself or the related expense report.

Documents with some relevance to this subject include: U.S. Pat. No. 6,032,137; US Patent Application Publication No. 2004/0028295; U.S. Pat. No. 5,910,988; U.S. Pat. No. 6,397,194; U.S. Pat. No. 6,816,608; US Patent Application Publication No. 2003/0158819; and "Phones with Eyes," The Economist (print edition), Mar. 10, 2005.

Until now, there has been no method available for 'manual data entry with digital record storing' where the manual data entry and the digital image storing can be conducted at any time and almost any location. Exemplary embodiments of the present invention combine the vast availability of mobile communication networks and programmable mobile handheld devices with integrated or interfacing digital cameras or scanners. Relevant accounting data is allowed to be stored with a digital image of a financial record at the time a paper record is received. This data can then automatically be enriched and transformed into an accounting record and without further manual intervention imported into a financial application. An administrative person can check and approve any accounting record instantaneously as each record is associated with exactly one receipt image.

SUMMARY OF THE INVENTION

The method of the current invention overcomes several shortcomings of prior methods of 'manual data entry with digital record storing'. The ability to view an accounting record associated with exactly one receipt image avoids timely searches through all digital images of one business trip until the correct receipt is found. The lengthy searches would not be avoided if all receipts of one business trip were digitalized and stored together in a single file. As the manually entered record data and digital image are entered and transmitted together using an easy to identify personal wireless mobile device, no complicated indexing process like barcode creation needs to be performed. Such complicated indexing processes are necessary for methods using different, non personal media the like facsimiles to transmit data and digital images. The record can be stored at the time it is received as well as the date of the record. The process of entering date of the record is eased by pre-populating the date field of the data entry form with the current date. As there is no time lag between the events of when a record is received and when the record can be entered into a data entry form, filling out the description or purpose field of this form doesn't require tedious mental reconstruction of the event which caused the receipt's creation. Instead, it can be completed while the traveler's memory is fresh. A fresh memory also allows easy storing of information not recorded on the paper receipt, like a tip given to a taxi driver. Since the time between when a record is received and when a record is entered can be greatly reduced, the possibility that a record is mutilated, partially obscured or even lost is almost eliminated. Another advantage of the timely entering of financial records is an up to date financial reporting capability. With this method, the initiator of the financial transaction can be identified through the transmission protocol. Then the transmitted data can easily be associated with the user profile which holds the information necessary to automatically create an accounting record.

Another advantage of the invention over prior art is one embodiment where a cell phone is the hand-held wireless device. Barcodes to identify the user are not required and the method is PERSONALIZED. E.g. the phone number is such a personalization, or a user name sent with the electronic receipt. Taking advantage of this fact, the system offers a very comfortable method of entering and further processing paper receipts without complicated barcodes.

The objective of the present invention to provide a fast convenient process for entering relevant accounting information about paper based financial records as well as a digital image of the paper record into electronic record processing systems and further into financial applications.

One exemplary method of the present invention comprises the steps of digitizing a paper receipt with a digital camera or scanner integrated with a wireless handheld device; checking the quality of the image on the handheld display by the handheld user; displaying a plurality of data entry forms on the display of the handheld device; receiving manual entered, record related and accounting relevant information from the handheld user; transmitting the record data and image to a secure storing system; creating accounting records by enriching the record data with accounting relevant information stored in a customer file; and forwarding the accounting record to any authorized financial application.

The transmission of the information can be conducted in many different ways. For example the electronic records can be sent via MMS (Multimedia Messaging Service), e-mail, through a secured web page, through a TCP/IP connection, through a Common Gateway Interface (CGI) or other network and telecommunication connections and protocols. In addition, all information can be encrypted before it is transmitted for privacy and security reasons.

The system of the current invention also relates to the process of entering and electronically storing paper based records accruing from financial transactions and making them available to financial applications for the purpose of monitoring the progress of business, preparing financial statements, identifying the source of receipts, keeping track of deductible expenses, preparing tax returns and supporting items reported on tax returns.

DESCRIPTION OF THE DRAWING

The invention will be described in connection with a drawing in several figures, of which:

FIG. 11 illustrates the data fields for a customer file

DETAILED DESCRIPTION

Figure 1:
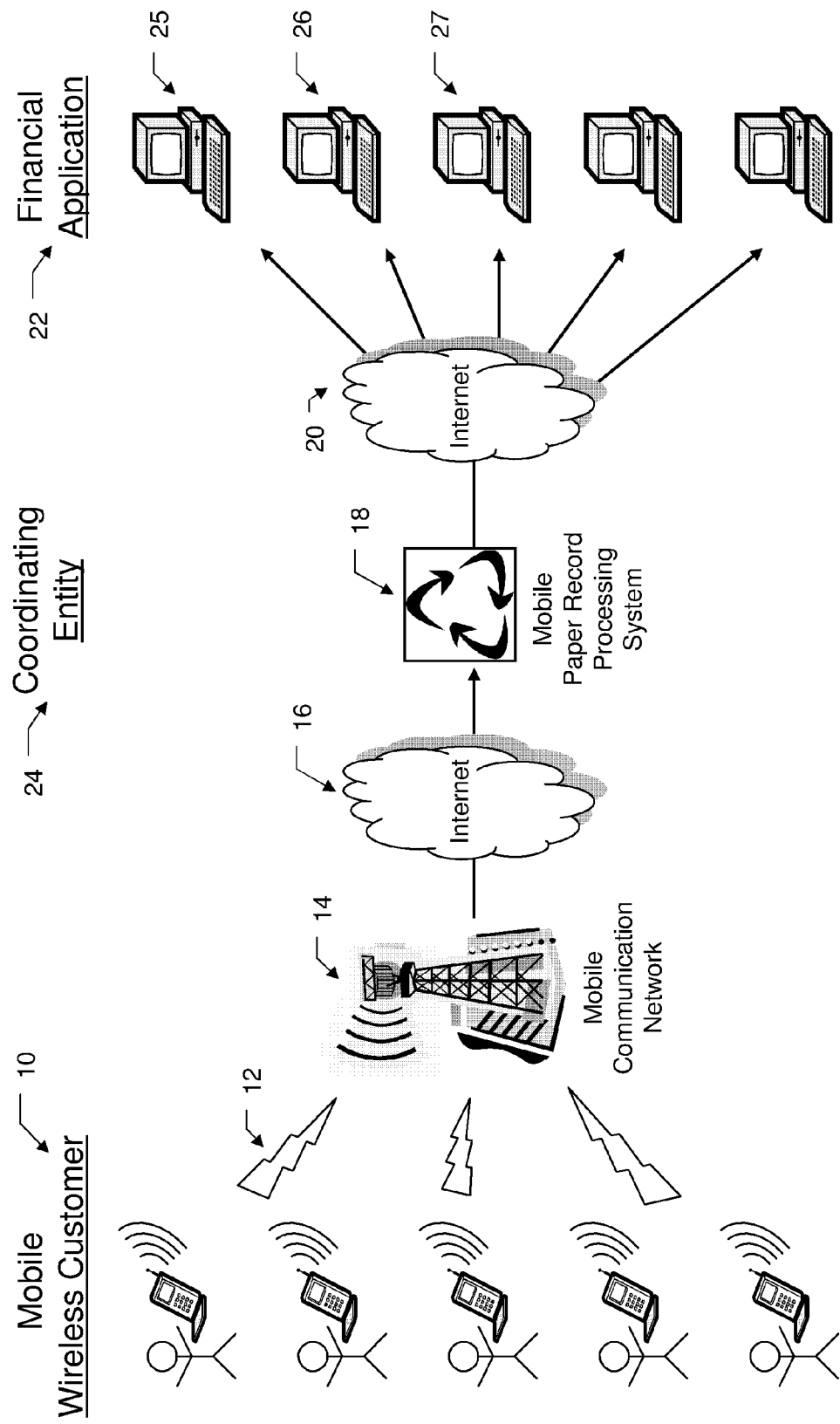
FIG. 1 illustrates an electronic paper record processing environment according to one embodiment of the present invention
Figure 2:
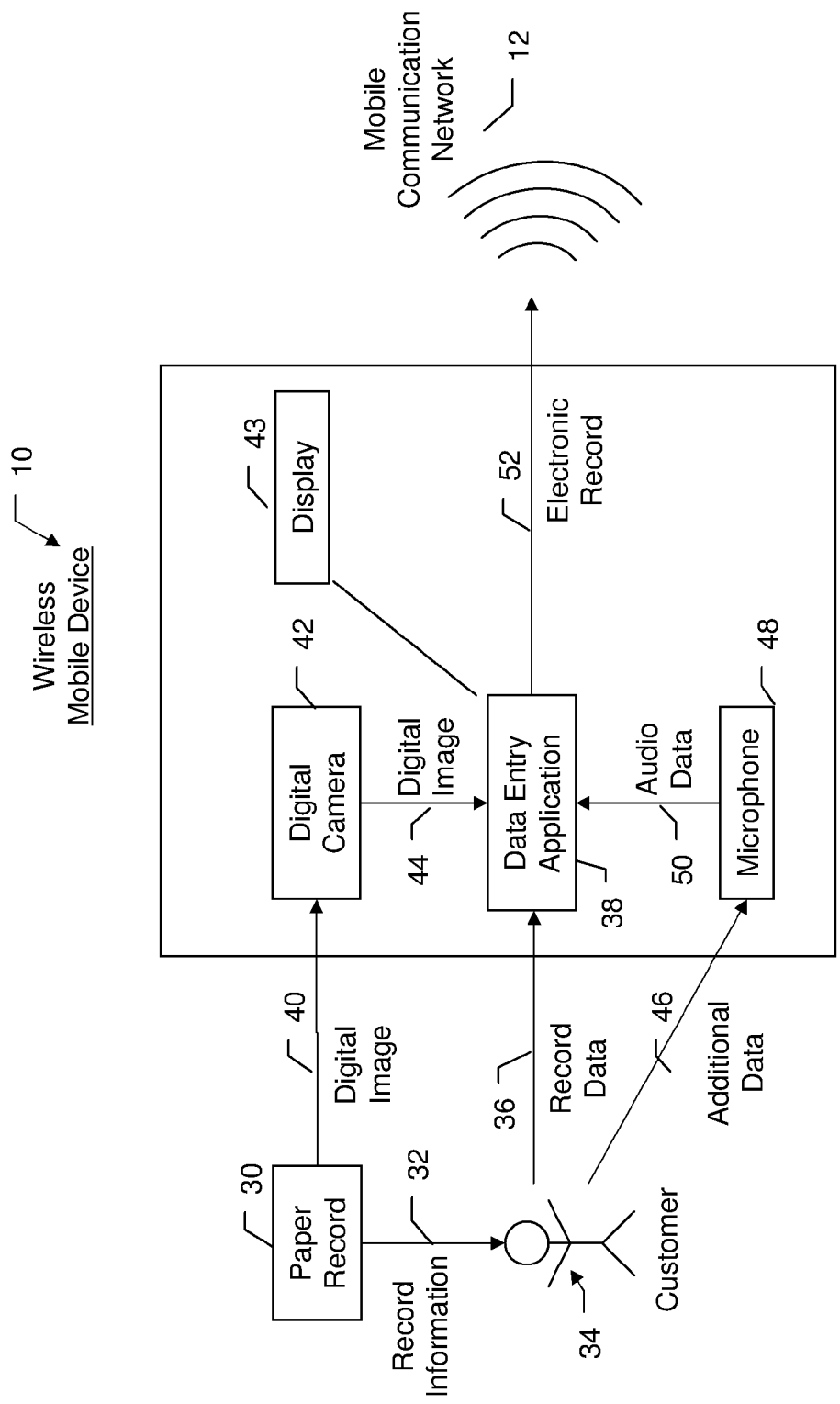
FIG. 2 illustrates a mobile device for electronic paper record data entry
Figure 3:
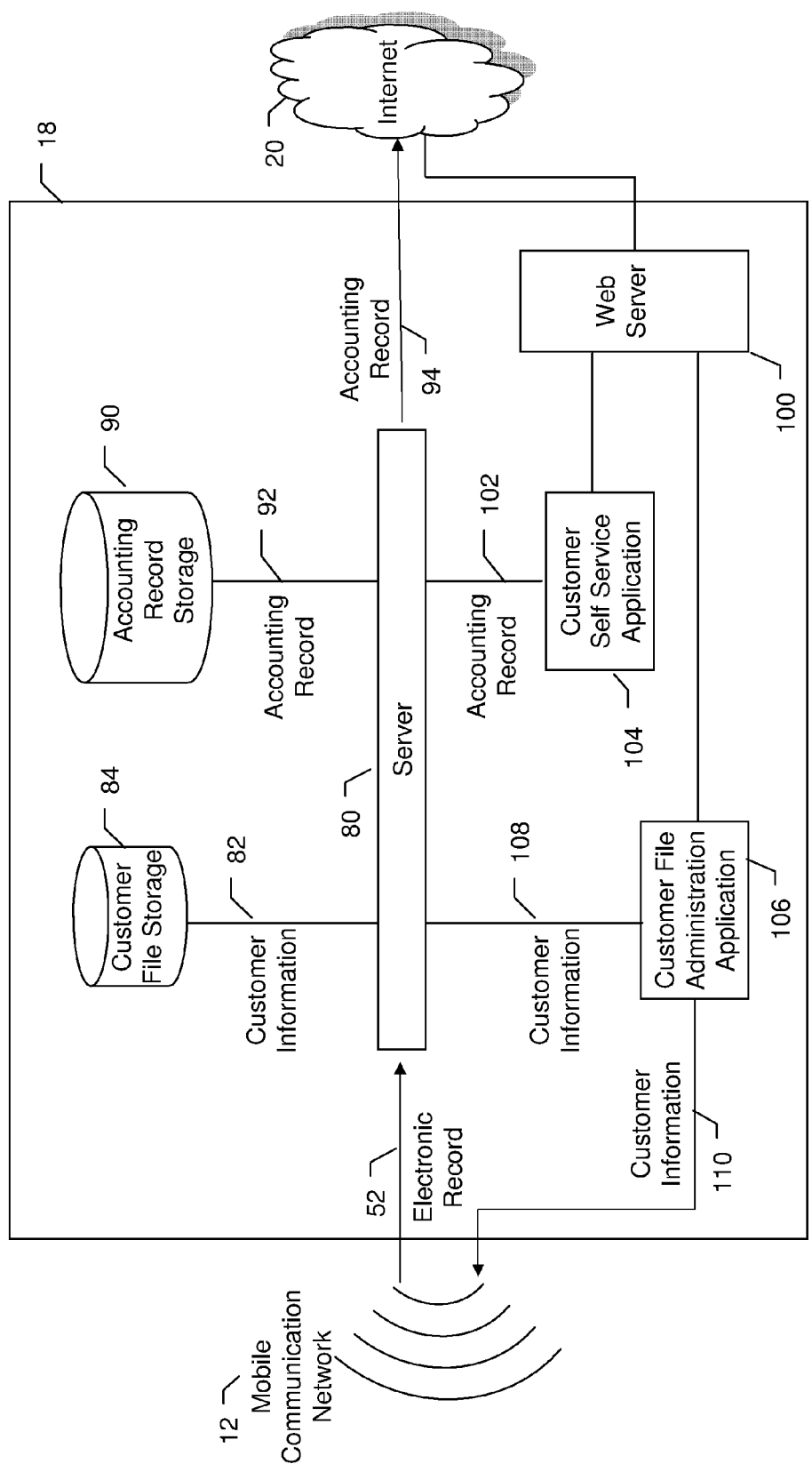
FIG. 3 illustrates one embodiment of the system of the current invention

FIG. 1 illustrates a mobile paper record processing environment according to one embodiment of the present invention. This environment is an example of an environment in which the system of the current invention (FIG. 3) may operate. It should be appreciated that systems according to the invention are suitable for use in a variety of environments. In one embodiment of the present invention, one part or the whole of the system might be installed on the mobile wireless device. In another embodiment, the accounting record storage 90 and/or the customer file storage 84 of the system (FIG. 3) might be a part of the financial application. The mobile paper record processing environment is suitable for creating an electronic record from a paper record and transmitting a created electronic record efficiently from the customer 10 to a financial application 22 using the system 18. Paper record 30 (FIG. 2) is originated by any possible market participant who issues paper based financial records, and is given to the customer 34 (FIG. 2). A paper based record may be a receipt, statement, invoice or any other record reflecting financial transactions between the merchant and the customer. Customer 34 is the receiver of the paper record 30 and responsible for creating the electronic record 52 from the paper record 30 to be sent to the system 18 (FIG. 1). The customer in this embodiment of the invention provides the wireless programmable handheld device 10 which has an integrated camera 42, scanner, video or audio recording 48 and data entry application 38 necessary to create the electronic record 52. A coordinating entity 24 (FIG. 1) is responsible for providing the System 18, wireless mobile application 38 (FIG. 2), operating rules, standards and procedures to facilitate reliable service operation. The coordinating entity 24 also provides hardware, software, and network communication for implementing the System 18, although portions of the system may be distributed throughout the mobile paper record processing environment (FIG. 1). Coordinating entity 24 also maintains customer files 84 (FIG. 3) and accounting record storage 90 (FIG. 3). The function of the coordinating entity 24 may be performed by a wide variety of businesses and organizations, by a government, and/or by a combination of organizations. The Financial application 22 (FIG. 1) receives accounting record 94 (FIG. 3) from coordinating entity 24. Embodiments of Financial application 22 may include a customer financial application 25, a business financial application 26 and a financial service provider financial application 27. Customer financial application 25 could be an application such as Intuit Quicken or Microsoft Money. Business financial application 26 may be an application such as an accounting system, an Enterprise Resource Planning System (ERP) or an expense management system. Financial service provider financial application 27 may be an application such as a corporate credit card financial application or a bill payment or presentment system.

The mobile device for electronic paper record data entry as shown in FIG. 2 is operated by the customer 34. A customer receives a paper record 30, takes the wireless mobile device 10 and starts the data entry application 38. The application leads the customer through a series of steps which include taking a digital image 44 of the paper record 30 with the digital camera 42 with sufficient resolution and focus (i.e. a viewer of an end product image can discern what was contained on the paper receipt); presenting the digital image 44 on the display 43 of wireless mobile device 10, so the customer can visually control the image quality; optionally creating a recording of verbal audio data 50 using the microphone 48; presenting a data entry form on the display 43 so the customer can manually enter record data 36 which he receives by reading the record information 32 presented on the paper record 30. After all of the data is entered, the data entry application 38 creates an electronic record 52 which is sent via a mobile communication network 12 to the System (FIG. 3).

Once the System of FIG. 3 receives electronic record 52 from wireless mobile device 10 (FIG. 2) via the mobile communication network 12, the System Server 80 (FIG. 3) creates accounting record 92 from the electronic record 52 and the customer information 82 residing in the customer file 84 and stores the accounting record 92 in the Accounting Record Storage 90. The accounting record 94 is then sent to financial application 22 (FIG. 1) or waits until either the financial application 22 or customer using the Customer Self Service Application 104 (FIG. 3), requests accounting record to be sent or downloaded. Depending on the capability of the financial application 22 to process images and/or audio files, the settings in the customer file 84 will indicate whether a copy of the digital receipt image and/or the audio file was attached to accounting record 94 when it was sent to the financial application 22 or not. Using the customer self service application 104, any authorized user can view, modify and delete the stored accounting records 102 (FIG. 3) or add a new accounting record. Further an authorized administrative person can be granted access to records in the accounting records storage 90 belonging to several other customers in order to check the correctness and approve accounting records before they are sent to financial application 22. One embodiment of the invention grants access to the customer self service application via a web server 100 (FIG. 3) and the Internet 20. Through the same web server access, authorized users can access customer file 84 using the customer file administration application 106. This access allows any adding, deleting and modifying of the customer information 108 stored in the customer file 84. Access to customer file administration application 106 can also be grated to other applications like the financial application 22 (FIG. 1) in order to automatically administer the customer file information. Another functionality of the customer file administration application 106 is to send customer information 110 to the wireless mobile device 10 (FIG. 2) where the data entry application 38 uses this customer information to customize the data entry. Examples of this customized data can be the cost types or the cost center.

Figure 4:
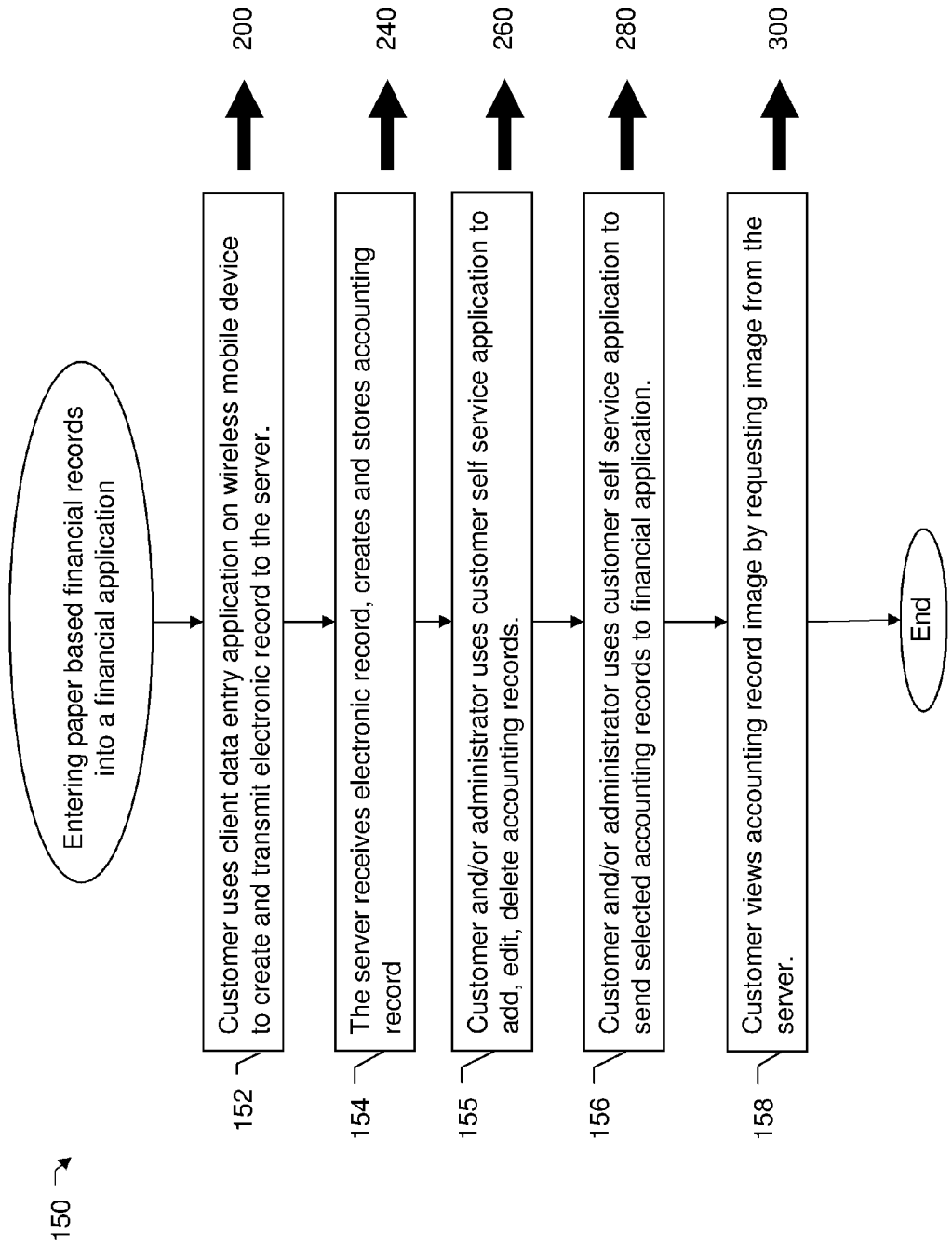
FIG. 4 illustrates a use case for processing paper records in a mobile environment

FIG. 4 illustrates a use case for processing paper records in a mobile environment. This is an embodiment of entering paper based financial records into a financial application 150. The customer uses client data entry application 38 (FIG. 2) on a mobile device with wireless communication functionality to create and transmit the electronic record 52 (FIG. 2) which is sent via a mobile communication network to a server 152.

The server receives the transmitted electronic record, validates the customer information using the customer data stored in the customer file and creates and stores an accounting record 154. The customer or administrator with user rights for the customer's account uses a self service application 104 (FIG. 3) to add, edit or delete accounting records 155, and export the accounting records to financial applications such as enterprise resource planning systems, accounting applications, corporate credit card applications, expense management applications or other financial applications for either business or personal use 156. Once the accounting records are stored in a financial application, the customer can view the accounting record image by requesting to view the image of an individual accounting record from the server 158. This is the end of Use Case.

Figure 5:
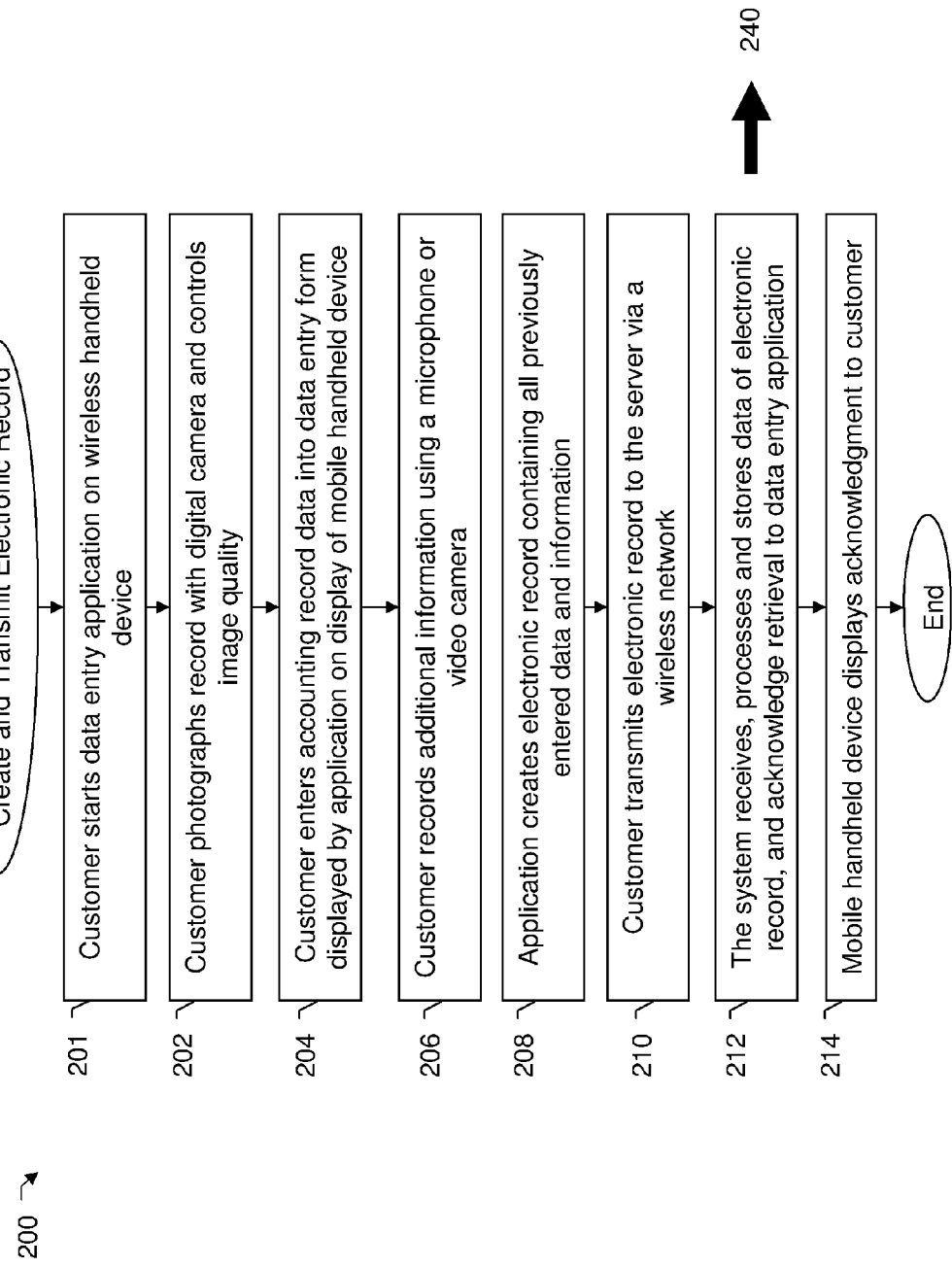
FIG. 5 illustrates a sequence for creating and transmitting electronic records

FIG. 5 shows a sequence diagram which describes how an electronic record is created and transmitted to a system of the current invention. This process creates an electronic record and transmits the record to the system 200. Using the wireless mobile device 10 (FIG. 2) a customer starts the data entry application 38 (FIG. 2), 201. The data entry application activates the camera integrated or interfacing the wireless mobile device and displays the current focus of the camera in a video mode. This allows the customer to focus on the paper record 30 (FIG. 2) and take a single picture. Although an exemplary embodiment of the invention is a camera built into a wireless phone, another possibility would be a scanner integrated into the phone which also would capture an image of a receipt. The data entry application stores the picture into a memory of the mobile wireless device and zooms into the stored picture sufficient enough to allow the customer to visually control the picture quality 202. In another embodiment of the present invention the user enters more than one picture. The data entry application then displays a form showing data entry tags such as, but not limited to: date, amount, currency, country, expense type, payment type, cost center and tax code. For certain tags such as, but not limited to: cost type, country, currency, tax code, cost center and payment type, the data entry application offer the customer a choice of pre-defined tag texts. The date tag is pre-populated with the current date. Cost center, country, currency and tax code are pre-populated from settings made previously in the data entry application. The data entry application prompts the customer to enter missing data or change pre-populated tag entries. The customer usually only needs to enter the amount as shown on the paper record 30 (FIG. 2) and choose a cost type and payment type. The customer enters data or chooses tag texts by using the input device of the wireless handheld device such as but not limited to, keyboard, stylus pen on a touch screen, or voice recognition. In another embodiment of present invention an OCR software can be used to automatically analyze the text on the paper record image and pre-populate the tag texts which the customer then only needs to control and eventually correct 204. The customer can record additional information of the accounting record using a microphone or video camera embedded in or interfacing with the wireless handheld device 206. From all of the entered tag texts, the record image and the additional data, the data entry application creates an electronic record 52 (FIG. 2), 208. The data entry application stores the electronic record in a memory of the wireless mobile device and transmits it to the server via a mobile communication network 12 (FIG. 2).

It is possible for mobile wireless devices to conduct the transmission of an electronic record in many different ways, for example via MMS (multimedia messaging service), email, through TCP/IP connection, through a Common Gateway Interface (CGI), via Bluetooth, Infrared or any other wireless network and telecommunication connection and protocol. However, in the context of the current invention, when the terms wireless, wireless communication network, wireless network, mobile network, or mobile communication network are mentioned, the terms are meant to mean a wireless method of communication which is capable of occurring over thousands of feet, such as a public wireless telephone network. In one embodiment of the invention all information is encrypted before being transmitted, for privacy and security purposes 210. In one embodiment of the present invention a mobile communication network is not available at the time an electronic record is acquired. The data entry application then waits with the transmittal of the electronic record until a mobile communication network becomes available. The server receives, processes and stores the information/data included in the electronic record, and sends an acknowledgment message back to the data entry application using the mobile communication network 212. The data entry application installed in the wireless mobile device displays an acknowledgment message to the customer in a form of a check mark next to the stored electronic record displayed on the wireless mobile device display 214.

Figure 6:
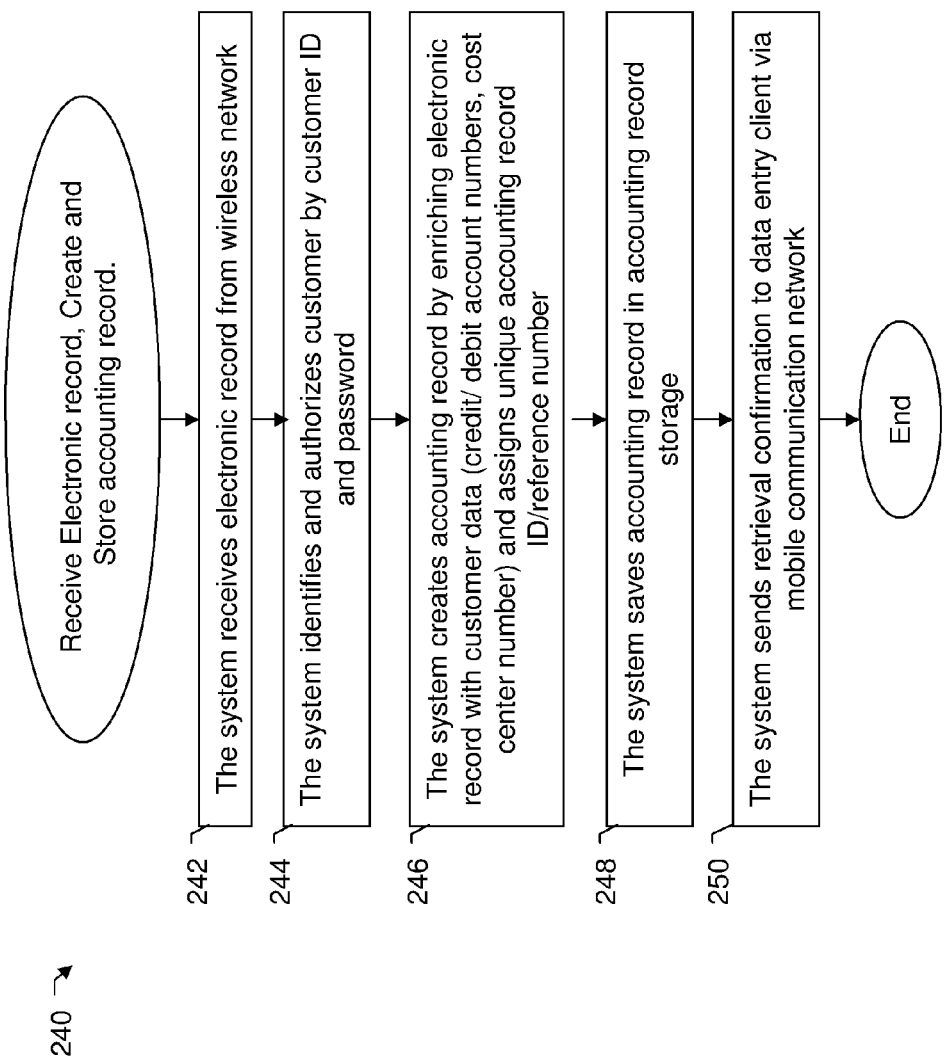
FIG. 6 illustrates a sequence for receiving data and storing electronic records

FIG. 6 shows a sequence diagram which illustrates how an electronic record is received by a system of the current invention and an accounting record is created and stored 240. The system receives the electronic record from mobile communication network 12 (FIG. 3), 242. The customer ID and password included in the electronic record are used to identify and authorize the customer. Therefore, the system takes the customer ID contained in the electronic record, looks up the matching customer ID in the customer file storage, and compares the passwords contained in the electronic record against the password retrieved from the customer file storage. In another embodiment of the present invention, the customers caller ID is used as customer ID 244. An accounting record is created by enriching an electronic record with customer data such as: credit/debit account numbers, cost center numbers, and a unique accounting record ID/reference number created and assigned. This record ID is used for later references to a specific accounting record 246. The accounting record is then stored in an accounting record storage 248. Finally the system sends a retrieval confirmation message back to the data entry application on the mobile wireless device using the mobile communication network 250.

Figure 7:
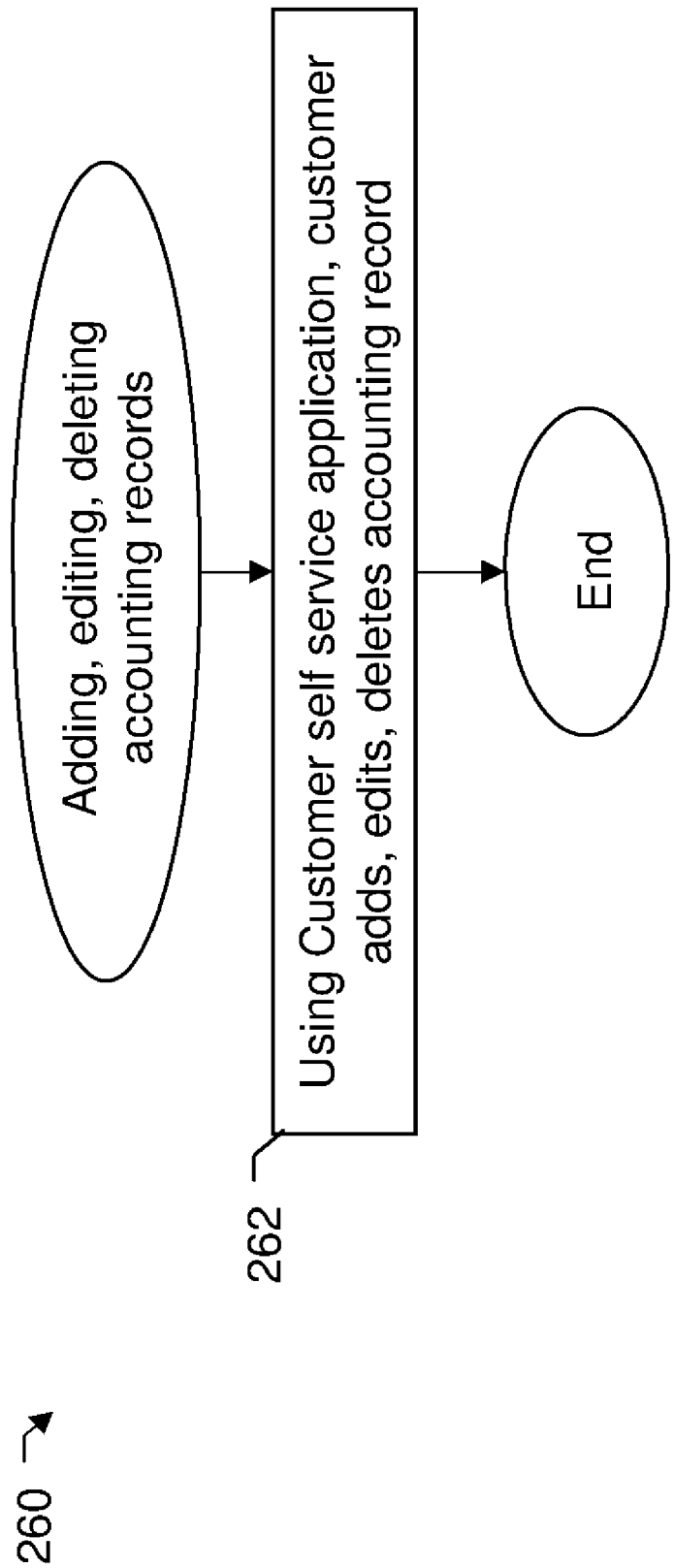
FIG. 7 illustrates a sequence for adding, editing, and deleting electronic records

FIG. 7 illustrates a sequence for adding, editing or deleting accounting record 260. The customer uses the customer self service application 104 (FIG. 3) to add, edit or delete an accounting record. The customer self services application is accessed via the Internet. In another embodiment of the invention, the customer self service application is installed on the mobile wireless device and can be accessed using its input device 262. In another embodiment of the invention, an administrator responsible for the customer account and with customers' account access rights may add, edit or delete accounting records.

Figure 8:
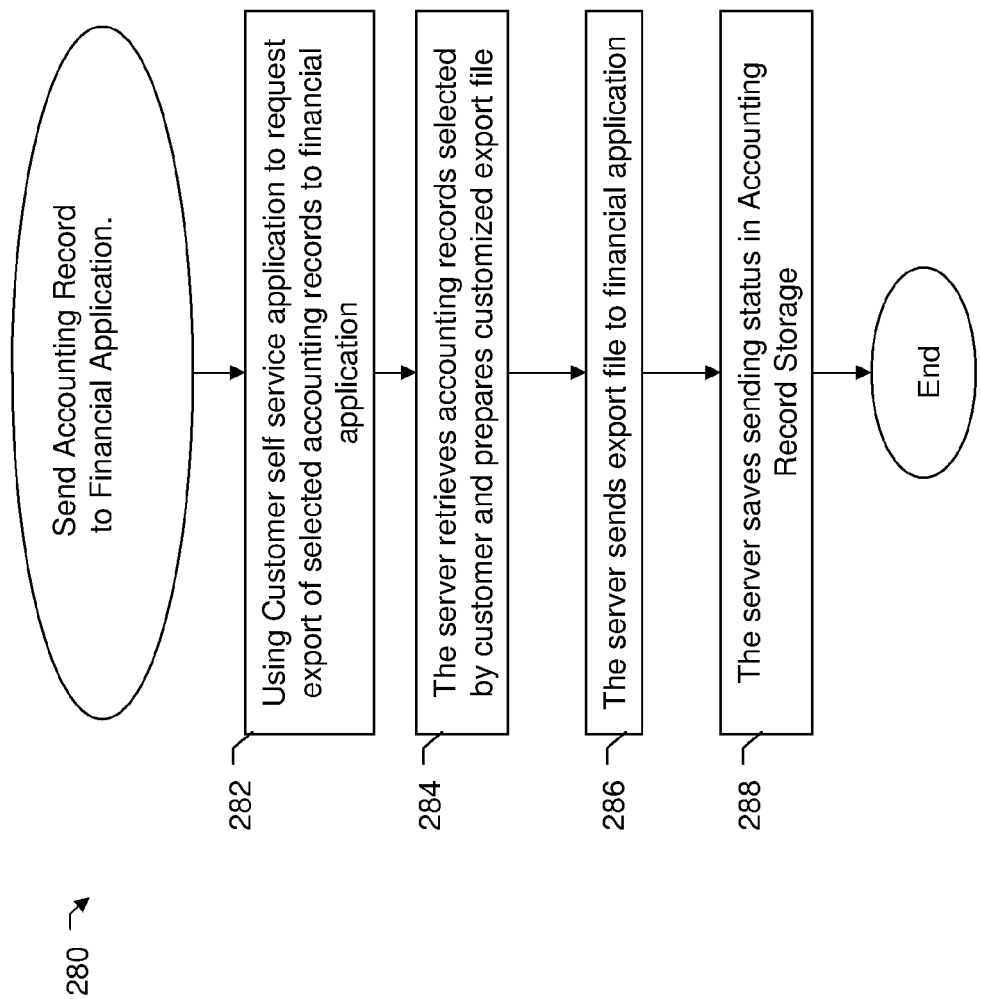
FIG. 8 illustrates a sequence for sending electronic records to a financial application

FIG. 8 illustrates a sequence for sending accounting records to financial application 280. The customer accesses the self service application where accounting records are displayed. The Customer selects accounting records to be exported and requests export of accounting records to the financial application 282. In another embodiment of the invention, an administrator responsible for the customer account may select accounting records and request export. The export request is sent to the server 80 (FIG. 2). The server looks up the customer file where the export format is defined. The server retrieves the previously selected accounting records and creates an export file according to the format defined in the customer file 284. In one embodiment of the invention, in the case that the accounting system has the capability of storing the digital paper record image, the export file can contain the paper record image. In another embodiment of the invention where the accounting system does not have the capability of storing paper record images, the paper record image resides stored in the system of the present invention and the export file only contains reference to the stored image for the purpose of future viewing of paper record image. The system sends the export file via a data communication network to the financial application 286. The communication from the server to the financial application is by any appropriate means of communicative coupling. It is a matter of design choice and the particular choice is not central to the invention. An exemplary choice might be a combination of LAN (local-area network) and WAN (wide-area network). In an exemplary embodiment of the invention, both links are fixed-location wired links. On the other hand, and as mentioned above, although communication networks in general may include among others, LAN, WAN, wireless LAN, Infrared, Bluetooth and Internet, the wireless communication network coupled directly to the invention's hand-held wireless device is a wireless communication network that involves the capability of the transfer of data over thousands of feet such as a public wireless telephone network.

After successful export, the system saves the accounting record status indicating a successful export in the accounting record storage 288. In one embodiment of the invention, an export is considered successful if an export file is successfully stored at a defined location. In another embodiment of the invention, an export is considered successful when an accounting system responds with a confirmation message that the export file is received.

Figure 9:
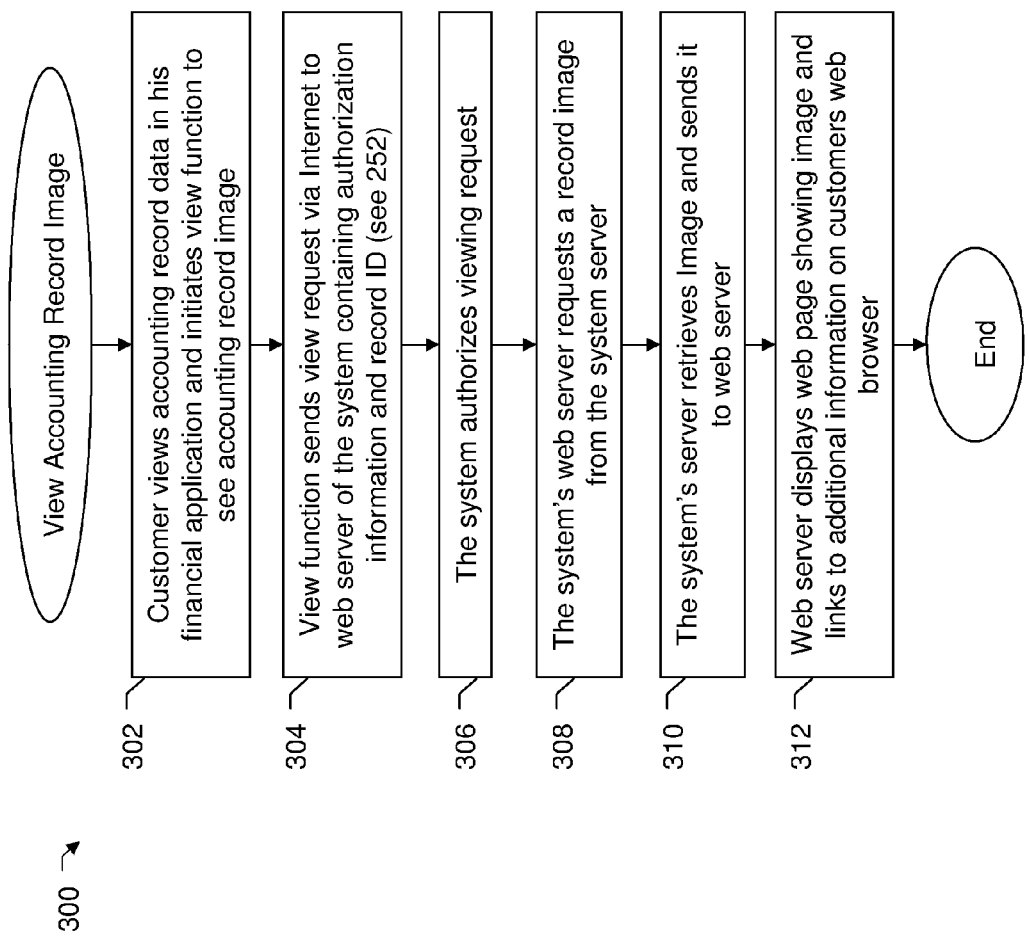
FIG. 9 illustrates a sequence for viewing a record image

FIG. 9 illustrates the sequence for viewing an accounting record image while using the accounting system 300. As most accounting applications only process accounting data, a viewing functionality is desirable in order to view paper record images. In an embodiment of the invention where the paper record image is stored in the accounting system, the viewing functionally is implemented in the accounting system 302. In an embodiment of the invention where the paper record images are stored in the record processing system 18 (FIG. 1) of the current invention, the sequence to view an accounting record is illustrated in the following steps. Each accounting record in the accounting system includes a hyperlink identifying the domain of the system 18 (FIG. 1), customer ID and the accounting record ID. Following this hyperlink 304 the web server 100 (FIG. 3) retrieves the customer ID, prompts the customer for authorization displaying a login screen 306. After successful authorization the system web server 100 (FIG. 3) sends a retrieval request containing the accounting record ID to the server 308. The system server 80 (FIG. 3) retrieves the image associated to the accounting record ID from the accounting record storage and sends the retrieved image back to the web server 100. The web server displays a web page on the customer's display, showing the accounting record image and hyperlinks to additional information eventually stored in the accounting record storage 312.

Figure 10:
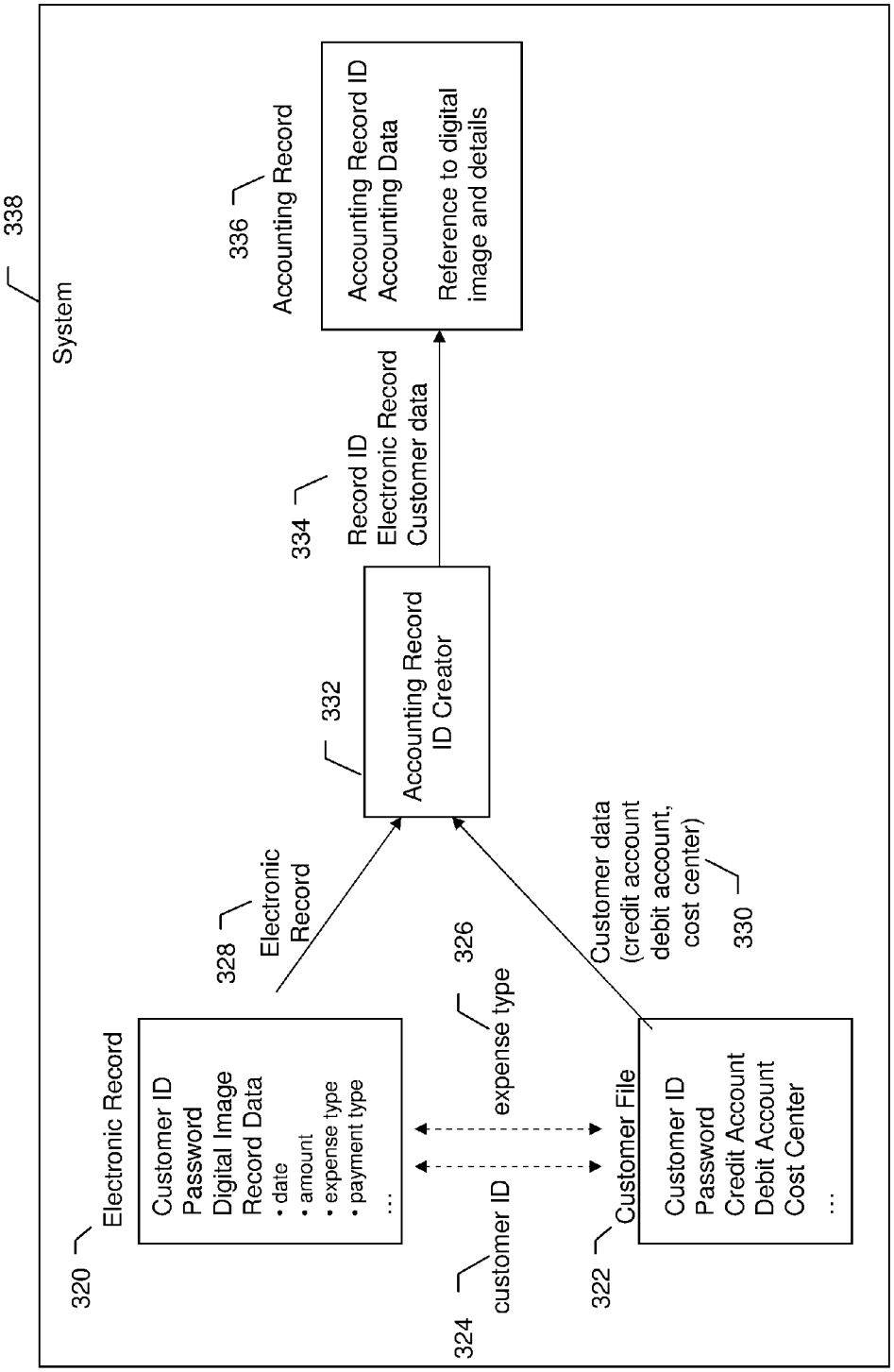
FIG. 10 illustrates a creation of an accounting record from an electronic record

FIG. 10 shows how an accounting record is created out of data from the electronic record, the customer file and the system ID creation. This task is performed after the system server receives a new electronic record from wireless mobile device. All transactions, data flows and functions necessary are performed by the system server 338. The customer ID 324 and the expense type 326 are taken from the electronic record 320 and sent to the customer file 322 to look up customer data 330. Electronic record 328 and customer data 330 are then sent to accounting record ID creator 332 to create a unique record ID. The accounting record 336 is then created from the record ID, the electronic record and the customer data 334.

FIG. 11 symbolically presents data elements and sample data of a customer file. In other embodiments of the invention, the content of the customer file can vary.

Figure 12:
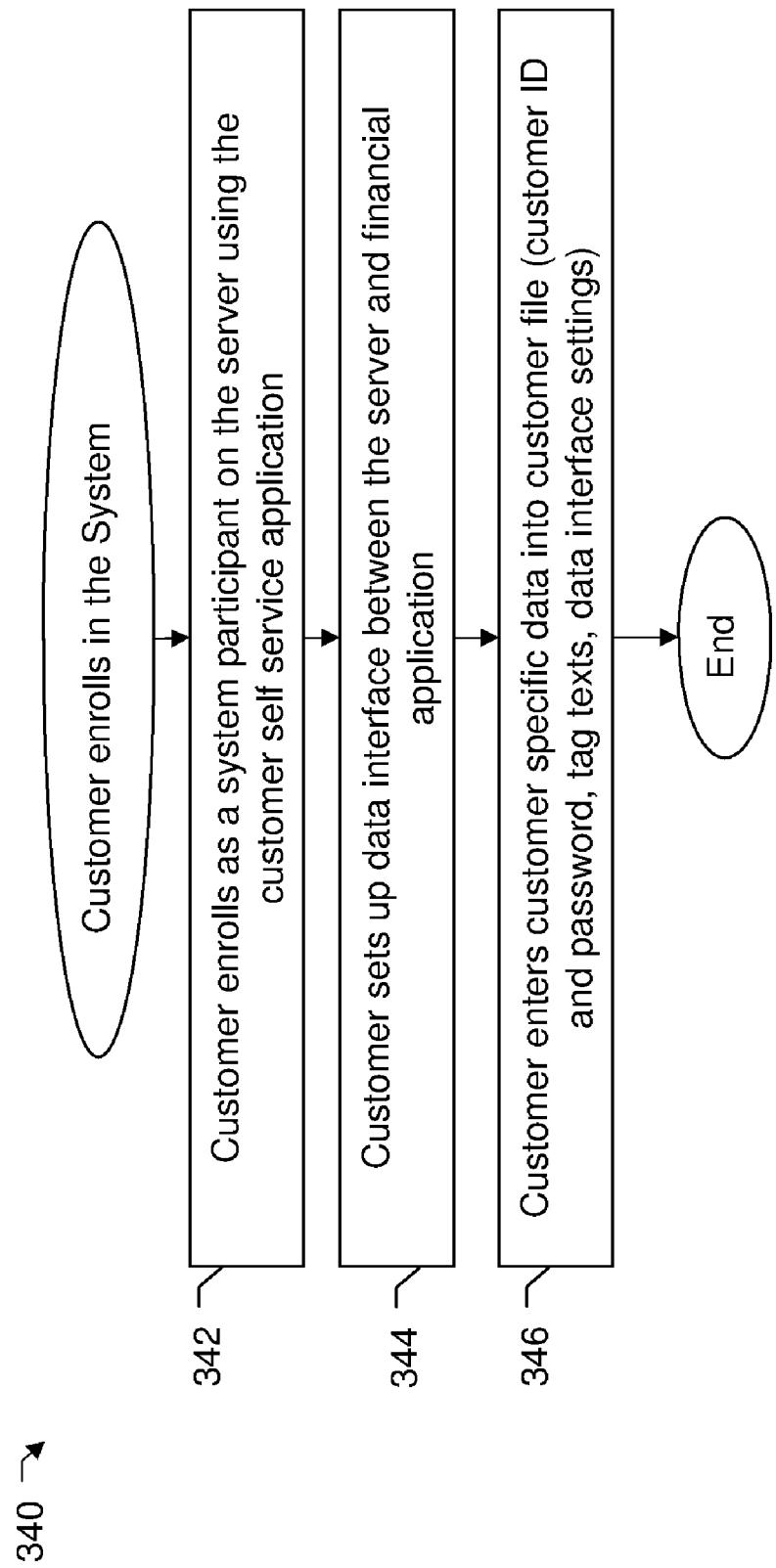
FIG. 12 illustrates a sequence of steps to setup a customer for the system of the current invention

FIG. 12 illustrates a sequence for a customer to enroll into a system 18 (FIG. 1) of the current invention 340. The customer enrolls as a system participant on the system server 80 (FIG. 3) by accessing the self service application via the internet 342. The customer is guided by the self service application to set up the interface between the system 18 (FIG. 1) and the accounting system 344. In one embodiment of the invention the customer manually enters customer specific and accounting relevant tag texts into the customer file where this information gets stored. Hereby the debit account, credit account and cost center need to be equal as set up in the accounting application. This customization insures that accounting records sent from the system 18 (FIG. 1) to the accounting application can be processed directly without any further manual intervention. In another embodiment of the invention, only the customer id is entered into the self service application. This customer id needs to be equal to the customer id used in the accounting application. By starting a synchronization process, all relevant customer data and tag texts, in detail debit accounts, credit accounts and cost centers are synchronized between the accounting system and the system 18 (FIG. 1). In the synchronization process the accounting application is the source system and the system 18 (FIG. 1) the target system. This synchronization process is implemented by an interface application using the application program interface (API) of the accounting application 346. The same automated or manual synchronization is performed to update the customer file data stored in the system 18 (FIG. 1) when ever changes in the tag texts occur in the accounting system. Common reasons for this are changing cost centers or tag texts.

Figure 13:
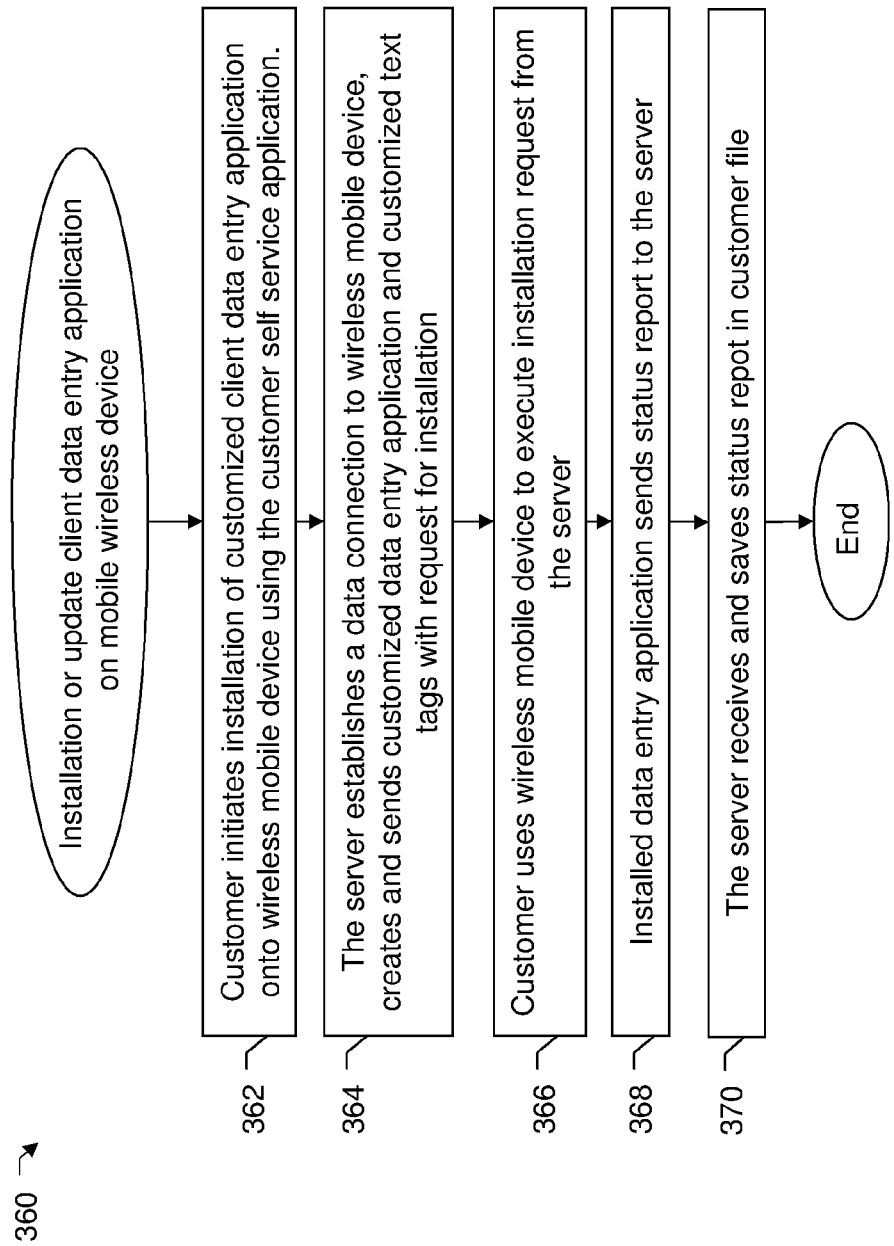
FIG. 13 illustrates a sequence of steps for installation or update of a client data entry application on a mobile wireless device.

FIG. 13 illustrates a sequence for installation or updating the client data entry application on the mobile wireless device 360. Accessing the customer file administration application over the internet, the customer initiates the installation or update process for the client data entry application 38 (FIG. 2). For both installation and update, the same process and sequence are executed. Before an initial installation can be performed, a customer enrollment as shown in FIG. 12 needs to be completed. An update of an existing client data entry application is necessary if the customer file has changed. The most common changes on the customer file are changes on the tag texts 362. In the case of an initial client data entry application installation, the client data entry application is customized with customer data from the customer file. This customization configures the client data entry application with the customer ID, tags and tag texts. This customization insures that electronic records send by the client data entry application to the system can be processed directly without any further manual intervention. The customized client data entry application and a request for application installation is then sent to the customer's mobile wireless device via a wireless network 364. A wireless mobile device receives client data entry application and a customer confirms the installation request using a keypad on wireless mobile device 366.

The wireless mobile device executes the installation of the data entry application. Once the data entry application is installed successfully, it sends a status report to the system using the wireless communication functionality of the wireless mobile device 368. The system receives the status report send by the data entry application and stores the status information in customer file. Status information can include installation date, data entry application version number, tags and tag texts or tags and tag texts codes 370.

Another embodiment of the invention is a method which is performed using a plurality of hand-held mobile self-powered wireless devices, a wide-area wireless communications network which is communicatively coupled with the plurality of hand-held mobile self-powered wireless devices, and an accounting system at a fixed location. The accounting system is communicatively coupled with the wide-area wireless communications network. Each hand-held mobile self-powered wireless device contains a memory, a human input device, a display, and an imaging device. The memory stores a plurality of tag texts.

Examples of hand-held mobile self-powered wireless devices for this exemplary embodiment of the invention include wireless telephones, cellular telephones, and wireless PCS telephones. Hand-held in the context of this invention means being small enough to be held in a human's hand. Wide-area wireless network in this instance means a wireless network capable of transmitting data over thousands of feet such as a public wireless telephone network. Self-powered with respect to the invention means that the device will have self-contained power available wherever the user wants to take the device. The wireless device is, in the present-day case, self-powered by means of a rechargeable battery such as a lithium-ion battery. Alternatively a fuel cell such as a direct methanol fuel cell may be used. In any event it should be appreciated that the device is portable and is handheld, and thus has very little in common in this regard with heavy, bulky, line-powered (mains-powered) fixed-location equipment such as desktop personal computers.

An accounting system with respect to the invention may be but is not limited to being a storage system, an application system, or a server. The accounting system may have single or multiple users.

In one exemplary embodiment, the hand-held mobile self-powered wireless device is a cellular or wireless telephone, generally in communication with a public wide-area wireless network such as a PCS, GSM, TDMA, or CDMA wireless network. The memory in such a device is typically an eeprom (electrically erasable read-only memory), or may optionally be a dynamic or static RAM (random-access memory) the contents of which are preserved because of power from a battery or other self-contained power source. In addition, some wireless telephones such as GSM telephones employ a SIM (subscriber identity module) with several kilobytes of EEPROM memory. In a typical embodiment of the invention, special software is installed in the telephone to effect the user interface elements described above. The software is stored in the memory of the telephone, and the software makes use of some portion of the memory of the telephone for storing configuration information and user data such as stored images and related data. In an exemplary embodiment the telephone contains an operating system such as Symbian that permits user selection of application software to be executed and that manages file storage and access to a hardware abstraction layer with respect to the telephone hardware. Such applications are typically written in Java or C++.

Human input devices with respect to the invention may include but are not limited to keyboards, touch pads, touch screens, microphones, scrolling and selecting buttons, stylus pens, numeric keypads, and alpha/numeric keypads.

The display of the wireless telephone is, in a typical embodiment, a color backlit liquid-crystal display. The display may be as small as 80 pixels wide and 110 pixels high, although more recent telephones have displays as wide as 200 pixels and as high as 400 pixels.

One exemplary method of the invention includes but is not necessarily limited to the following steps.

A first user at a first location employs the imaging device of a respective first hand-held mobile self-powered wireless device to capture an image of a first document.

A document in this instance may include but is not limited to a paper with typewritten text, a paper with handwritten text, and financial receipts. In the exemplary embodiment of the invention in which a camera is used, it would not be unusual for the camera being used to also capture an images such as a gas pump showing a total number of gallons and price, or an image of a pay telephone showing price and number of minutes which could later be associated with images of financial receipts.

The first user at the first location employs the human input device of the respective first hand-held mobile self-powered wireless device to tag the image of the first document with one of the plurality of tag texts stored in the memory of the respective first hand-held mobile self-powered wireless device and with first numerical information indicative of the first document.

Numerical information may include but is not limited to dates, monetary amounts, number of persons, identifying codes.

The first user at the first location causes the respective first hand-held mobile self-powered wireless device to commence transmission of the image of the first document and the tag and the first numerical information indicative of the first document through the wide-area wireless communications network to the accounting system.

The accounting system stores the first image and the tag and the first numerical information indicative of the first document along with information indicative of an identity of the first user.

A second user at a second location differing from the first location, employs the imaging device of a respective second hand-held mobile self-powered wireless device to capture an image of a second document.

The second user at the second location employs the human input device of the respective second hand-held mobile self-powered wireless device to tag the image of the second document with one of the plurality of tag texts stored in the memory of the respective second hand-held mobile self-powered wireless device and with second numerical information indicative of the second document.

The second user causes the respective second hand-held mobile self-powered wireless device to commence transmission of the image of the second document and the tag and the second numerical information indicative of the second document through the wide-area wireless communications network to the accounting system.

The accounting system stores the second image and the tag and the second numerical information indicative of the second document along with information indicative of an identity of the second user.

The first user at a third location differing from the first location and differing from the second location, employs the imaging device of the respective first hand-held mobile self-powered wireless device to capture an image of a third document.

The first user at the third location employs the human input device of the respective first hand-held mobile self-powered wireless device to tag the image of the third document with one of the plurality of tag texts stored in the memory of the respective first hand-held mobile self-powered wireless device and with third numerical information indicative of the third document.

The first user at the third location causes the respective first hand-held mobile self-powered wireless device to commence transmission of the image of the third document and the tag and the third numerical information indicative of the third document through the wide-area wireless communications network to the accounting system.

The accounting system stores the third image and the tag and the third numerical information indicative of the third document along with information indicative of the identity of the first user.

The second user at a fourth location differing from the first location, differing from the second location, and differing from the third location, employs the imaging device of the respective second hand-held mobile self-powered wireless device to capture an image of a fourth document.

The second user at the fourth location employs the human input device of the respective second hand-held mobile self-powered wireless device to tag the image of the fourth document with one of the plurality of tag texts stored in the memory of the respective second hand-held mobile self-powered wireless device and with fourth numerical information indicative of the fourth document.

The second user causes the respective second hand-held mobile self-powered wireless device to commence transmission of the image of the fourth document and the tag and the fourth numerical information indicative of the fourth document through the wide-area wireless communications network to the accounting system.

The accounting system stores the fourth image and the tag and the fourth numerical information indicative of the fourth document along with information indicative of the identity of the second user.

The accounting system causes a first new and different tag text to be communicated wirelessly to the first hand-held mobile self-powered wireless device.

The accounting system causes a second new and different tag text to be communicated wirelessly to the second hand-held mobile self-powered wireless device.

The first user at a fifth location differing from the first location, differing from the second location, differing from the third location, and differing from the fourth location, employs the imaging device of the respective first hand-held mobile self-powered wireless device to capture an image of a fifth document.

The first user at the fifth location employs the human input device of the respective first hand-held mobile self-powered wireless device to tag the image of the fifth document with the first new and different tag text stored in the memory of the respective first hand-held mobile self-powered wireless device and with fifth numerical information indicative of the fifth document.

The first user at the fifth location causes the respective first hand-held mobile self-powered wireless device to commence transmission of the image of the fifth document and the tag and the fifth numerical information indicative of the fifth document through the wide-area wireless communications network to the accounting system.

The accounting system stores the fifth image and the tag and the fifth numerical information indicative of the fifth document along with information indicative of the identity of the first user.

The second user at a sixth location differing from the first location, differing from the second location, differing from the third location, differing from the fourth location, and differing from the fifth location, employs the imaging device of the respective second hand-held mobile self-powered wireless device to capture an image of a sixth document.

The second user at the sixth location employs the human input device of the respective second hand-held mobile self-powered wireless device to tag the image of the sixth document with the second new and different text tag stored in the memory of the respective second hand-held mobile self-powered wireless device and with sixth numerical information indicative of the sixth document.

The second user at the sixth location causes the respective second hand-held mobile self-powered wireless device to commence transmission of the image of the sixth document and the tag and the sixth numerical information indicative of the sixth document through the wide-area wireless communications network to the accounting system.

The accounting system stores the sixth image and the tag and the sixth numerical information indicative of the sixth document along with information indicative of the identity of the second user.

Each mobile device is (as mentioned above) configured to provide a convenient user interface. The user interface will, in an exemplary embodiment, provide a pull-down menu of possible tags to be used in identifying a particular expense item. Each tag is associated internally with a code or value that is used to communicate the meaning of the tag to the central system. A typical tag might be "hotel expense" and would be associated with some internal code. The image being tagged is stored in the memory of the device, and the code corresponding to a tag selected by the user would itself be stored. In addition, in the case of many if not most expense items, the user would enter a numerical value indicative of the amount of money involved with the expense. These three data items (the image file, the tag code, and the numerical value) are transmitted, optionally with other information as well, to the central server at a time when the device is in communication with the wireless network. Importantly, the device may save up the data items at a time when no connectivity is available, and will in such a case forward the data items later when connectivity becomes available. In a commonplace situation it can be expected that there may be an interval of at least five minutes, and in some cases more than an hour, between the assembly of data items (image, tag, numerical information) and the actual communication of the data items away from the wireless device.

In an exemplary embodiment the tagging is done by user keystrokes at the device keyboard. With some devices a touch screen may be the most convenient way to do the tagging. Finally, if a robust speech recognition capability is provided in the device, then the speech recognition may be used to perform the selection of a tag and the entry of a numerical value.

In another embodiment of the invention, a human user reviews each of the stored images and its associated tag and then for each stored image, posts information indicative of the stored image and its associated tag and its associated numerical information to a system of financial accounts.

In another embodiment of the invention, a user receives a first receipt reflecting a monetary transaction. Next the user captures an image of the first receipt with a camera. The user then creates a first electronic record with a data entry application. The first electronic record is transmitted from the data entry application to a communication device. Then the first electronic record is transmitted from the communication device to the Internet via a communication network. From the Internet, the first electronic record is transmitted to a data storage center. Next the user accesses the first electronic record stored in the data storage center with a self-service application. The user views the first electronic record. The user performs any necessary editing of the first electronic record. The user saves any changes made to the first electronic record. The user sends the first electronic record to a financial application. In the case that this user did not send the first electronic record to a financial application, it would be possible for a second user, utilizing a financial application, to access the data storage center to access the record.

As mentioned above the system according to the invention provides a mechanism for updating the tags used by users when tagging expense items. The need for an update may be prompted by a change in tax laws, by accession of a country into (e.g.) European Union, or by a change in the relevant accounting rules. A consultant may add a client, calling for a new tag to identify the new client (in contradistinction to other pre-existing clients). An employee may come to need the ability to charge to a different corporate cost center than before. In any of these cases it is needed to update the tags. In the system according to the invention, preferably the system will "push" new tag information to each affected mobile device. This "push" may be by a TCP/IP session, an SMS session, or other data format from the system to the wireless device. One way to do this is to send a small message communicating the tag information and little else. Another extreme is to push a replacement of the application (e.g. a new version number of the application) into the wireless device, which new version contains at least new tags and perhaps other new things. Between these extremes is the approach of transmitting a configuration or data file, which the application consults to determine the tag text to use.

In any of these approaches it is desirable to use a CRC (cyclic redundancy check) or checksum or parity check to confirm that the entirety of the "pushed" information has actually reached the mobile device and to confirm that there has not been a loss or corruption of the data. It is desirable to have a "handshake" by which the mobile device passes a confirmation back to the system to permit the system to know that the update has succeeded.

Those skilled in the art will have no difficulty whatsoever in devising myriad obvious variations and improvements of the invention, when informed with the enabling disclosure provided herein. All such obvious variations and improvements are intended to be encompassed by the claims which follow.

What is claimed is:

1. A method performed with respect to a plurality of hand-held mobile self-powered wireless devices, a wide-area wireless communications network communicatively coupled with the plurality of mobile self-powered wireless devices, and an accounting system at a fixed location, the accounting system communicatively coupled with the wide-area wireless communications network, each mobile self-powered wireless device having a memory, a human input device, a display, and an imaging device, the memory storing a plurality of tag texts, the method comprising the steps of:

by a first user at a first location, employing the imaging device of a respective first hand-held mobile self-powered wireless device to capture an image of a first document;

by the first user at the first location, employing the human input device of the respective first hand-held mobile self-powered wireless device to tag the image of the first document with one of the plurality of tag texts stored in the memory of the respective first hand-held mobile self-powered wireless device and with first numerical information indicative of the first document;

by the first user at the first location, causing the respective first hand-held mobile self-powered wireless device to commence transmission of the image of the first document and the tag and the first numerical information indicative of the first document through the wide-area wireless communications network to the accounting system;

by the accounting system, storing the first image and the tag and the first numerical information indicative of the first document along with information indicative of an identity of the first user;

by a second user at a second location differing from the first location, employing the imaging device of a respective second hand-held mobile self-powered wireless device to capture an image of a second document;

by the second user at the second location, employing the human input device of the respective second hand-held mobile self-powered wireless device to tag the image of the second document with one of the plurality of tag texts stored in the memory of the respective second hand-held mobile self-powered wireless device and with second numerical information indicative of the second document;

by the second user, causing the respective second hand-held mobile self-powered wireless device to commence transmission of the image of the second document and the tag and the second numerical information indicative of the second document through the wide-area wireless communications network to the accounting system;

by the accounting system, storing the second image and the tag and the second numerical information indicative of the second document along with information indicative of an identity of the second user;

by the first user at a third location differing from the first location and differing from the second location, employing the imaging device of the respective first hand-held mobile self-powered wireless device to capture an image of a third document;

by the first user at the third location, employing the human input device of the respective first hand-held mobile self-powered wireless device to tag the image of the third document with one of the plurality of tag texts stored in the memory of the respective first hand-held mobile self-powered wireless device and with third numerical information indicative of the third document;

by the first user at the third location, causing the respective first hand-held mobile self-powered wireless device to commence transmission of the image of the third document and the tag and the third numerical information indicative of the third document through the wide-area wireless communications network to the accounting system;

by the accounting system, storing the third image and the tag and the third numerical information indicative of the third document along with information indicative of the identity of the first user;

by the second user at a fourth location differing from the first location, differing from the second location, and differing from the third location, employing the imaging device of the respective second hand-held mobile self-powered wireless device to capture an image of a fourth document;

by the second user at the fourth location, employing the human input device of the respective second hand-held mobile self-powered wireless device to tag the image of the fourth document with one of the plurality of tag texts stored in the memory of the respective second hand-held mobile self-powered wireless device and with fourth numerical information indicative of the fourth document;

by the second user, causing the respective second hand-held mobile self-powered wireless device to commence transmission of the image of the fourth document and the tag and the fourth numerical information indicative of the fourth document through the wide-area wireless communications network to the accounting system;

by the accounting system, storing the fourth image and the tag and the fourth numerical information indicative of the fourth document along with information indicative of the identity of the second user;

by the accounting system, causing a first new and different tag text to be communicated wirelessly to the first hand-held mobile self-powered wireless device;

by the accounting system, causing a second new and different tag text to be communicated wirelessly to the second hand-held mobile self-powered wireless device;

by the first user at a fifth location differing from the first location, differing from the second location, differing from the third location, and differing from the fourth location, employing the imaging device of the respective first hand-held mobile self-powered wireless device to capture an image of a fifth document;

by the first user at the fifth location, employing the human input device of the respective first hand-held mobile self-powered wireless device to tag the image of the fifth document with the first new and different tag text stored in the memory of the respective first hand-held mobile self-powered wireless device and with fifth numerical information indicative of the fifth document;

by the first user at the fifth location, causing the respective first hand-held mobile self-powered wireless device to commence transmission of the image of the fifth document and the tag and the fifth numerical information indicative of the fifth document through the wide-area wireless communications network to the accounting system;

by the accounting system, storing the fifth image and the tag and the fifth numerical information indicative of the fifth document along with information indicative of the identity of the first user;

by the second user at a sixth location differing from the first location, differing from the second location, differing from the third location, differing from the fourth location, and differing from the fifth location, employing the imaging device of the respective second hand-held mobile self-powered wireless device to capture an image of a sixth document;

by the second user at the sixth location, employing the human input device of the respective second hand-held mobile self-powered wireless device to tag the image of the sixth document with the second new and different text tag stored in the memory of the respective second hand-held mobile self-powered wireless device and with sixth numerical information indicative of the sixth document;

by the second user at the sixth location, causing the respective second hand-held mobile self-powered wireless device to commence transmission of the image of the sixth document and the tag and the sixth numerical information indicative of the sixth document through the wide-area wireless communications network to the accounting system;

by the accounting system, storing the sixth image and the tag and the sixth numerical information indicative of the sixth document along with information indicative of the identity of the second user.

2. The method of claim 1 wherein the human input device is a keyboard.

3. The method of claim 1 wherein the human input device is a touchpad.

4. The method of claim 1 wherein the human input device is a touchscreen.

5. The method of claim 1 wherein the imaging device is a camera.

6. The method of claim 1 wherein each hand-held mobile self-powered wireless device is a wireless telephone.

7. The method of claim 6 wherein the wireless telephone is a PCS telephone.

8. The method of claim 1 further comprising the steps of;

by a human user, reviewing each of the stored images and the stored image's associated tag;

for each stored image, posting information indicative of the stored image and the stored image's associated tag and the stored image's associated numerical information to a system of financial accounts.

9. A method performed with respect to a plurality of hand-held mobile self-powered wireless devices, a wide-area wireless communications network communicatively coupled with the plurality of mobile self-powered wireless devices, and an accounting system at a fixed location, the accounting system communicatively coupled with the wide-area wireless communications network, each mobile self-powered wireless device having a memory, a human input device, a display, and an imaging device, the memory storing a plurality of tag texts, the method comprising the steps of:

by a first user at a first location, employing the imaging device of a respective first hand-held mobile self-powered wireless device to capture an image of a first document;

by the first user at the first location, employing the human input device of the respective first hand-held mobile self-powered wireless device to tag the image of the first document with one of the plurality of tag texts stored in the memory of the respective first hand-held mobile self-powered wireless device and with first numerical information indicative of the first document;

by the first hand-held mobile self-powered wireless device, finding that the first hand-held mobile self-powered wireless device lacks data connectivity to the wide-area wireless communications network;

at a later time, by the first hand-held mobile self-powered wireless device, finding that the first hand-held mobile self-powered wireless device has data connectivity to the wide-area wireless communications network;

by the first hand-held mobile self-powered wireless device, transmitting the image of the first document and the tag and the first numerical information indicative of the first document through the wide-area wireless communications network to the accounting system;

by the accounting system, storing the first image and the tag and the first numerical information indicative of the first document along with information indicative of an identity of the first user;

by a second user at a second location differing from the first location, employing the imaging device of a respective second hand-held mobile self-powered wireless device to capture an image of a second document;

by the second user at the second location, employing the human input device of the respective second hand-held mobile self-powered wireless device to tag the image of the second document with one of the plurality of tag texts stored in the memory of the respective second hand-held mobile self-powered wireless device and with second numerical information indicative of the second document;

by the second hand-held mobile self-powered wireless device, finding that the second hand-held mobile self-powered wireless device lacks data connectivity to the wide-area wireless communications network;

at a later time, by the second hand-held mobile self-powered wireless device, finding that the second hand-held mobile self-powered wireless device has data connectivity to the wide-area wireless communications network;

by the second hand-held mobile self-powered wireless device, transmitting the image of the second document and the tag and the second numerical information indicative of the second document through the wide-area wireless communications network to the accounting system;

by the accounting system, storing the second image and the tag and the second numerical information indicative of the second document along with information indicative of an identity of the second user.

10. The method of claim 9 wherein the finding of the lack of data connectivity and the finding of data connectivity define an interval, and the interval is at least five minutes.

11. The method of claim 10 wherein the interval is at least an hour.

12. The method of claim 9 wherein the human input device is a keyboard.

13. The method of claim 9 wherein the human input device is a touchpad.

14. The method of claim 9 wherein the human input device is a touchscreen.

15. The method of claim 9 wherein the imaging device is a camera.

16. The method of claim 9 wherein each hand-held mobile self-powered wireless device is a wireless telephone.

17. The method of claim 16 wherein the wireless telephone is a PCS telephone.

18. The method of claim 9 further comprising the steps of;

by a human user, reviewing each of the stored images and the stored image's associated tag;

for each stored image, posting information indicative of the stored image and the stored image's associated tag and the stored image's associated numerical information to a system of financial accounts.

19. A system relating to storage and handling of documents, the system comprising:

a multiplicity of hand-held mobile self-powered wireless devices, a wide-area wireless communications network communicatively coupled with the plurality of mobile self-powered wireless devices, and an accounting system at a fixed location, the accounting system communicatively coupled with the wide-area wireless communications network, each mobile self-powered wireless device having a memory, a human input device, a display, and an imaging device, the memory storing a plurality of tag texts;

each mobile self-powered wireless device having means providing a user interface by which a user may employ the imaging device to capture an image of a document, and may employ the human input device to tag the image of the document with one of the plurality of tag texts stored in the memory of the hand-held mobile self-powered wireless device and to tag the image of the document with first numerical information indicative of the first document;

each mobile self-powered wireless device having means acquiring information as to whether the wireless device has data connectivity through the wide-area wireless communications network, said means disposed to store the image and tag and numerical information until such time as data connectivity is available, and at such time as data connectivity is available, to transmit the image and tag and numerical information through the wide-area wireless communications network to the accounting system;

the accounting system disposed to store received image and tag and the numerical information along with information indicative of the identity of the user associated therewith;

each mobile self-powered wireless device having means responsive to a communication from the accounting system, communicating a new and different tag text to be communicated wirelessly to the hand-held mobile self-powered wireless device, said new and different text tag thereafter being available to a user by means of the user interface of the mobile self-powered wireless device.

20. The system of claim 19 wherein the human input device is a keyboard.

21. The system of claim 19 wherein the human input device is a touchpad.

22. The system of claim 19 wherein the human input device is a touchscreen.

23. The system of claim 19 wherein the imaging device is a camera.

24. The system of claim 19 wherein each hand-held mobile self-powered wireless device is a wireless telephone.

25. The system of claim 24 wherein the wireless telephone is a PCS telephone.

26. A method performed with respect to a plurality of hand-held mobile self-powered wireless devices, a wide-area wireless communications network communicatively coupled with the plurality of mobile self-powered wireless devices, and an accounting system at a fixed location, the accounting system communicatively coupled with the wide-area wireless communications network, each mobile self-powered wireless device having a memory, a human input device, a display, and an imaging device, the memory storing a plurality of tag texts, the method comprising the steps of:

by a first user at a first location, employing the imaging device of a respective first hand-held mobile self-powered wireless device to capture an image of a first document;

by the first user at the first location, employing the human input device of the respective first hand-held mobile self-powered wireless device to tag the image of the first document with one of the plurality of tag texts stored in the memory of the respective first hand-held mobile self-powered wireless device and with first numerical information indicative of the first document;

by the first hand-held mobile self-powered wireless device, finding that the first hand-held mobile self-powered wireless device lacks data connectivity to the wide-area wireless communications network;

at a later time, by the first hand-held mobile self-powered wireless device, finding that the first hand-held mobile self-powered wireless device has data connectivity to the wide-area wireless communications network;

by the first hand-held mobile self-powered wireless device, transmitting the image of the first document and the tag and the first numerical information indicative of the first document through the wide-area wireless communications network to the accounting system;

by the accounting system, storing the first image and the tag and the first numerical information indicative of the first document along with information indicative of an identity of the first user;

by a second user at a second location differing from the first location, employing the imaging device of a respective second hand-held mobile self-powered wireless device to capture an image of a second document;

by the second user at the second location, employing the human input device of the respective second hand-held mobile self-powered wireless device to tag the image of the second document with one of the plurality of tag texts stored in the memory of the respective second hand-held mobile self-powered wireless device and with second numerical information indicative of the second document;

by the second hand-held mobile self-powered wireless device, finding that the second hand-held mobile self-powered wireless device Jacks data connectivity to the wide-area wireless communications network;

at a later time, by the second hand-held mobile self-powered wireless device, finding that the second hand-held mobile self-powered wireless device has data connectivity to the wide-area wireless communications network;

by the second hand-held mobile self-powered wireless device, transmitting the image of the second document arid the tag and the second numerical information indicative of the second document through the wide-area wireless communications network to the accounting system;

by the accounting system, storing the second image and the tag and the second numerical information indicative of the second document along with information indicative of an identity of the second user;

by the accounting system, causing a first new and different tag text to be communicated wirelessly to the first hand-held mobile self-powered wireless device;

by the accounting system, causing a second new and different tag text to be communicated wirelessly to the second hand-held mobile self-powered wireless device;

by the first user at a third location differing from the first location, differing from the second location, employing the imaging device of the respective first hand-held mobile self-powered wireless device to capture an image of a third document;

by the first user at the third location, employing the human input device of the respective first hand-held mobile self-powered wireless device to tag the image of the third document with the first new and different tag text stored in the memory of the respective first hand-held mobile self-powered wireless device and with third numerical information indicative of the third document;

by the first user at the third location, causing the respective first hand-held mobile self-powered wireless device to commence transmission of the image of the third document and the tag and the third numerical information indicative of the third document through the wide-area wireless communications network to the accounting system;

by the accounting system, storing the third image and the tag and the third numerical information indicative of the third document along with information indicative of the identity of the first user.

27. The method of claim 26 wherein the finding of the lack of data connectivity and the finding of data connectivity define an interval, and the interval is at least five minutes.

28. The method of claim 27 wherein the interval is at least an hour.

29. The method of claim 26 wherein the human input device is a keyboard.

30. The method of claim 26 wherein the human input device is a touchpad.

31. The method of claim 26 wherein the human input device is a touchscreen.

32. The method of claim 26 wherein the imaging device is a camera.

33. The method of claim 26 wherein each hand-held mobile self-powered wireless device is a wireless telephone.

34. The method of claim 26 wherein the wireless telephone is a PCS telephone.

35. The method of claim 26 further comprising the steps of;

by a human user, reviewing each of the stored images and its associated tag;

for each stored image, posting information indicative of the stored image and its associated tag and its associated numerical information to a system of financial accounts.

* * * * *